March 19, 1968 W. R. RABSON ETAL 3,374,459
LOGGING CHANNEL DISABLING CIRCUIT
Filed April 16, 1965
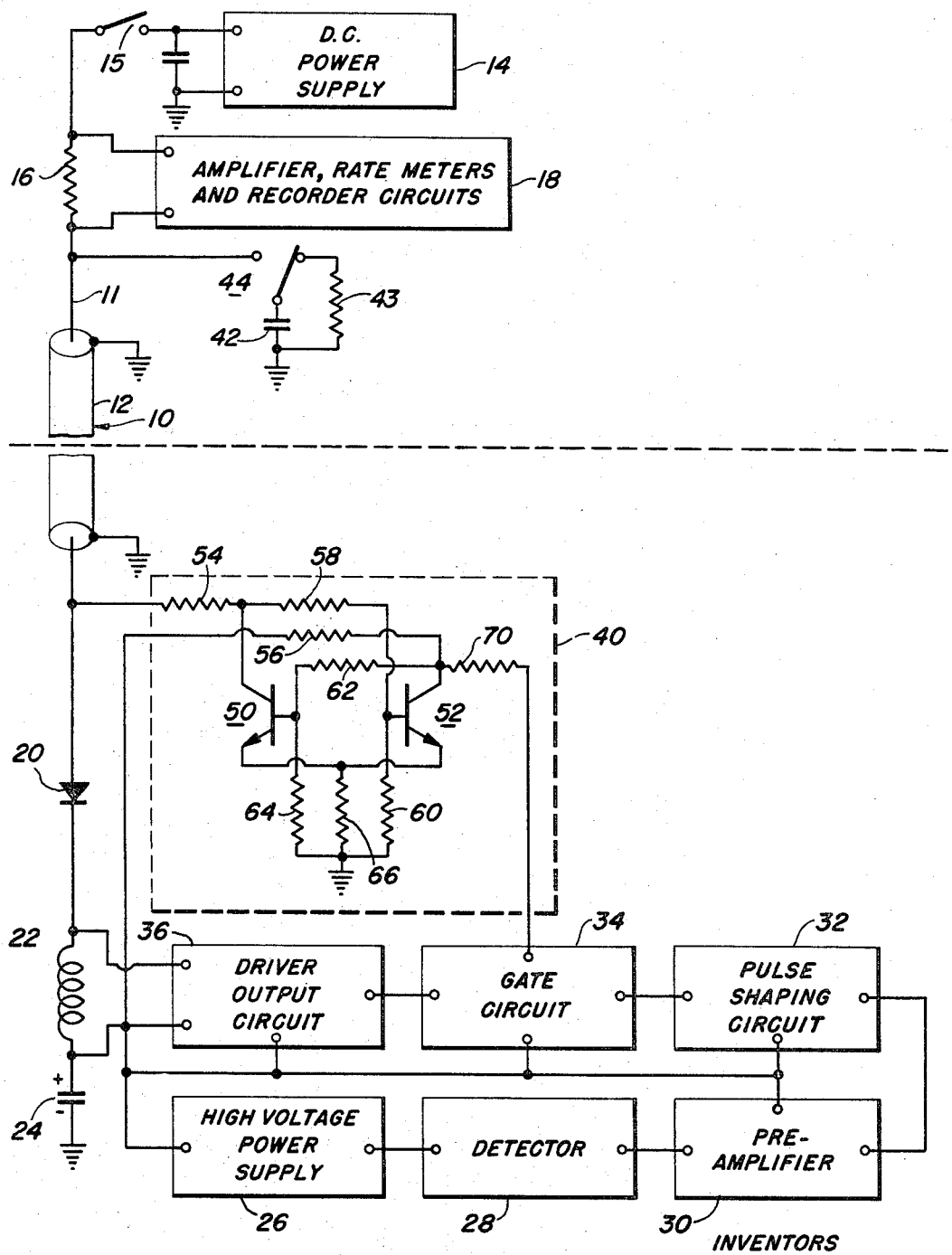
INVENTORS
WILLIAM R. RABSON,
HOMER M. WILSON and
LEROY C. DeLaTORRE
BY
Mason, Kolehmainen, Rathburn and Wyss.
ATTORNEYS 3,374,459
LOGGING CHANNEL DISABLING CIRCUIT
William R. Rabson, Homer M. Wilson, and Leroy C. De la Torre, Houston, Tex., assignors, by mesne assignments, to PGAC Development Company, Houston, Tex., a corporation of Delaware
Filed Apr. 16, 1965, Ser. No. 448,802
7 Claims. (Cl. 340—18)

The present invention relates to well logging systems, and, more particularly, to an arrangement for electrically disabling one channel of a multi-channel system.

In well logging arrangements it is sometimes desirable to cut off or disable one of the channels. For example, in a dual channel radiation well logging system which includes detectors for detecting both neutrons and gamma rays, it is customary to calibrate the neutron detector with a suitable neutron source. This calibration operation is usually carried out at the earth's surface and since the conventional neutron source also emits a large number of gamma rays for each neutron, the gamma ray detector usually produces so many pulses, due to the presence of the large number of gamma rays emitted by the neutron source, that accurate calibration of the neutron source is prevented. This is particularly true in those operations where pulses from both the neutron and gamma ray detectors are transmitted over the same conductor of the supporting cable since the large number of gamma ray pulses on this conductor masks or obscures the neutron pulses and prevents their accurate calibration.

In order to disable the gamma ray channel for neutron calibration purposes, or the like, it has been customary to provide some sort of physically actuable device to turn off the gamma ray detector. Usually, this physically actuable device has comprised a gravity operated switch which operated to disconnect the high voltage source from the gamma ray detector, when the logging instrument was laid on its side. Such an arrangement is in many instances cumbersome and unwieldy, and it would be desirable to provide a disabling arrangement which could be controlled while the instrument is in any physical position, including the vertical.

It is, therefore, an object of the present invention to provide a new and improved logging channel disabling circuit wherein one or more of the above-discussed disadvantages of prior art arrangements is avoided.

It is another object of the present invention to provide a new and improved logging channel disabling circuit in which electrical means are employed to disable the logging channel and such means is operable entirely from the earth's surface and irrespective of the physical position of the subsurface unit of the logging system.

It is a further object of the present invention to provide a new and improved logging channel disabling circuit wherein a control circuit in the subsurface unit responds to a control pulse generated at the earth's surface and transmitted over the cable by disabling the logging channel electrically.

It is a still further object of the present invention to provide a new and improved logging channel disabling circuit wherein pulses which are normally applied to the cable in the subsurface unit may be blocked or disabled in response to the transmission of a control pulse to the subsurface unit from the earth's surface and resumption of normal transmission of these pulses is effected by momentary disconnection of the well logging power source from the cable at the earth's surface.

It is another object of the present invention to provide a new and improved logging channel disabling circuit which is simple and economical in operation and effectively disables a given detector channel without requiring physical movement of the subsurface unit.

Briefly, in accordance with one aspect of the invention, a bistable control circuit is provided in the subsurface unit which is arranged to respond to the application of power to the unit from the earth's surface by assuming a predetermined condition of conduction. When it is desired to turn off the logging channel, a large negative control pulse is developed at the surface and transmitted over the cable to the subsurface unit. This control pulse is employed to change the bistable control circuit to its opposite condition of conduction, and this change in conduction is employed to control a gate circuit in the subsurface unit which blocks the transmission of pulses to the cable. As a result, pulse transmission is terminated in response to the development of the above described control pulse at the earth's surface.

When it is desired to resume logging operation on this channel, the power source provided for the subsurface unit at the earth's surface is disconnected from the cable and is then reconnected thereto. When power is disconnected, the bistable control circuit is deenergized and when power is reapplied this circuit automatically assumes its initial condition in which the gate circuit is enabled and pulse transmission is not blocked.

The invention, both as to its organization and method of operation, together with further objects and advantages thereof, will best be understood by reference to the following specification taken in connection with the accompanying drawings in which the single figure of the drawings is a schematic diagram of a well logging system embodying the features of the present invention.

Referring now to the drawings, the present invention is therein illustrated as comprising a well logging cable 10 which, in the illustrated embodiment, has a single center conductor 11 and an outer sheath 12 which is connected to ground. The cable 10 is arranged to support and control movement of a subsurface unit, a portion of which is indicated below the horizontal dotted line in the drawing. A portion of the surface equipment of the logging system is shown above this horizontal line in the drawing. While the present invention is illustrated and described in connection with a radiation logging system, it will be understood that the invention has general application to any other type of logging system, such as an acoustic logging system, wherein pulses are transmitted over the cable to the earth's surface and it is desired to disable one pulse transmission channel.

Considering first the surface equipment in the illustrated radiation well logging system, a D.C. power supply 14 is provided which produces a unidirectional voltage or current suitable for energizing the circuitry in the subsurface unit of the system. Preferably, the power supply 14 comprises a constant current power source of the type described and claimed in a copending application of William R. Rabson, Thomas A. Rabson, Homer M. Wilson and Leroy C. De la Torre, Ser. No. 449,495 which was filed on April 20, 1965 and is assigned to the same assignee as the present invention. Power from the source 14 is supplied through a control switch 15, and a small series resistor 16 to the center conductor 11 of the cable 10. The logging signals, which are developed in the subsurface unit by means to be described in more detail hereinafter, are transmitted over the cable 10 to the earth's surface and are developed across the resistor 16. These signals are suitably amplified, are separated in the event a dual channel logging system is utilized and are applied to suitable rate meter circuits the outputs of which are supplied to a suitable recorder, this surface equipment being indicated generally by the block 18.

In the subsurface unit, the center conductor 11 of the cable 10 is connected through a rectifier 20, and a winding 22, across which the detector pulses are produced, to a storage or filter capacitor 24 the bottom end of which is connected to ground and hence through the sheath 12 of the cable 10 to the other terminal of the power supply 14. The voltage thus produced across the capacitor 24 is employed to energize the circuitry in the subsurface unit, a portion of which is shown in the drawing. Thus, the voltage developed across the capacitor 24 is applied to a high voltage power supply 26 which develops a high voltage suitable for energizing a radiation detector 28. The output of the detector 28 is supplied to a preamplifier 30 wherein the detector output signal is amplified and is supplied to a pulse shaping circuit 32 which has the function of suitably shaping the detector pulses for transmission over the cable 10 to the earth's surface. The output of the pulse shaping circuit 32 is coupled through a gate circuit 34 to a driver output circuit 36 the output winding 22 of which is connected in series with the center conductor 11, as described heretofore. Accordingly, when the gate circuit 34 is enabled, pulses from the detector 28 are developed across the winding 22 and thus applied to the cable 10 for transmission to the earth's surface.

The portion of the subsurface equipment shown in the drawing comprises one channel of the logging system. For example, the detector 28 may comprise the logging channel of the system which detects gamma rays. In the event that the entire system is a dual channel one, a separate detector, suitable pulse shaping circuits and driver output circuit would be provided for applying the output pulses thereof to the cable 10. However, since these other portions of a dual logging system are not important to the present invention, they have not been shown in the drawings.

Under certain conditions it is desirable to turn off the gamma ray detector channel. For example, when the other detector channel of the system is employed to detect neutrons and it is desired to calibrate the neutron detector with a suitable neutron source the gamma ray detector 28 may produce an excessive number of pulses which will prevent the accurate calibration of the detector in the opposite channel. In order to disable the gamma ray channel in a simple, economical and reliable manner without physically changing the position of the subsurface unit, there is provided in accordance with the present invention a bistable control circuit indicated generally at 40 in the subsurface unit. At the earth's surface a large capacitor 42, which may have a capacitance value of 200 microfarads, is normally shunted by a low-value resistor 43 so that the capacitor 42 is normally discharged. However, when the momentary switch 44 provided in the surface equipment is depressed to the left-hand position, the capacitor 42 is connected directly to the center conductor 11. When so connected, the capacitor 42 is charged very quickly to the potential of the power supply 14 since it is charged through the small resistor 16. However, charging of the capacitor 42 does cause a dip in the voltage appearing between the center conductor 11 and the sheath 12 which dip disappears as soon as the condenser 42 is charged. This voltage dip or negative control pulse is of relatively large amplitude as compared to the detector pulses transmitted to the earth's surface from the subsurface unit, and this negative control pulse is transmitted down the cable 10 to the subsurface equipment.

In the subsurface unit, the negative control pulse produced by charging of the capacitor 42 at the earth's surface is transmitted to the bistable control circuit 40 which comprises a pair of transistors 50 and 52 which are interconnected to comprise a flip-flop circuit. More particularly, the collector of the transistor 50 is connected through a load resistor 54 to the center conductor 11 of the cable 10. The collector of the transistor 52 is connected through a resistor 56 to the supply voltage developed across the capacitor 24 in the subsurface unit. The collector of the transistor 50 is also connected to the base of the transistor 52 through a resistor 58 and this base is connected to ground through a resistor 60. In a similar manner the collector of the transistor 52 is connected to the base of the transistor 50 through a resistor 62 and this base is connected to ground through a resistor 64. The emitters of the transistors 50 and 52 are connected together and to ground through a common emitter resistor 66.

The bistable control circuit 40 is arranged so that the transistor 52 is normally conducting. However, when the negative control pulse described heretofore is transmitted down the center conductor 11 this control pulse is applied through the resistors 54 and 58 to the base of the transistor 52 so that this control pulse tends to turn the transistor 52 off. Since the B plus supply for the transistor 50 is the same conductor on which the negative control pulse appears, the negative control pulse in effect reduces the supply voltage for the transistor 50. On the other hand, the supply voltage for the collector of the transistor 52 remains substantially constant since this voltage is derived from the filter capacitor 24 and the voltage across this capacitor does not immediately decrease. This is because the capacitor 24 is disconnected from the negative control pulse applied to the collector of the transistor 50 due to the fact that the diode 20 is rendered non-conductive by this negative control pulse. Inclusion of the rectifier diode 20 between the conductor 11 and the capacitor 24 has the further advantage that the negative control pulse is not absorbed in the large filter capacitor 24 since the diode 20 is rendered non-conductive by the leading edge of the control pulse.

The negative control pulse is thus effective to turn off the transistor 52 and turn on the transistor 50, and the transistor 50 remains turned on after the disappearance of the negative control pulse on the conductor 11.

The potential at the collector of the transistor 52 thus rises in response to the negative control pulse supplied to the conductor 11 and this positive potential increase is applied through a suitable isolating resistor 70 to the gate circuit 34. The gate circuit 34 responds to this potential increase by blocking further transmission of pulses to the cable 10. Therefore, the illustrated gamma ray channel is effectively cut off or disabled in response to the connection of the capacitor 42 to the cable conductor 11 at the earth's surface.

When it is desired to reactivate the gamma ray channel in the subsurface unit, it is only necessary to remove power from the upper end of the cable 10 by momentarily turning the switch 15 to the off position. When the switch 15 is thereafter closed to re-establish the application of power to the cable conductor 11, the bistable control circuit 40 in the subsurface unit responds to the reapplication of power by returning to its initial position in which the transistor 52 is continuously conductive. Changing of the flip-flop 50, 52 back to its initial condition is insured both by the voltage divider networks 58, 60 and 62, 64 and also because of the fact that when power is reapplied to the cable conductor 11 a positive voltage is applied directly to the base of the transistor 52 whereas the base of the transistor 50 must receive a positive bias from the filter capacitor 24 which takes a certain finite time to charge up to the D.C. level on the conductor 11 through the diode 20 and the secondary winding 24. This insures that the transistor 52 is always rendered conductive when power is either initially supplied to the subsurface unit or has been removed and reapplied by the switch 15.

When the transistor 52 is again turned on, the voltage at the collector thereof falls to a relatively low value so that the gate circuit 34 is again enabled and permits the transmission of pulses from the circuit 32 to the cable 10 in the normal manner. In this connection it will be understood that the capacitor 42 must be disconnected from the line by actuation of the switch 44 and discharged through the resistor 43 before it can be used to develop another negative cutoff pulse to turn the gamma ray channel off again in the subsurface unit.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a well logging system, the combination of, a subsurface unit, a cable for moving said unit through a bore hole, a unidirectional power source at the earth's surface and connected to the upper end of said cable, a measuring device in said unit and arranged to provide an electrical signal, proportional to a measured variable, means for connecting said electrical signal to the lower end of said cable for transmission to the earth's surface, means in said unit utilizing power transmitted over said cable from said source to energize said measuring device, means at the earth's surface for developing a control pulse, means for applying said control pulse to the upper end of said cable for transmission to said unit, means in said unit for receiving said control pulse and developing a blocking signal in response thereto, means responsive to said blocking signal for preventing said electrical signal from being impressed upon the lower end of said cable, means at the earth's surface for disconnecting said source from said cable, and means in said unit and responsive to said disconnection of said source by said last named means for disabling said blocking signal developing means, thereby to restore connection of said electrical signal to the lower end of said cable when said source is again connected to said cable.

2. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said measuring device being arranged to develop electrical pulses corresponding to a measured variable, means coupling said pulses to the bottom end of said cable for transmission to the earth's surface, means at the earth's surface for developing a control pulse and applying the same to the upper end of said cable for transmission to said unit, means in said unit and responsive to said control pulse for preventing said pulses from being coupled to said cable, means at the earth's surface for momentarily disconnecting said source from said cable, and means in said unit and responsive to said momentary disconnection of said source from said cable for restoring the coupling of said pulses to said cable.

3. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said device being arranged to develop electrical pulses corresponding to a measured variable, a gate circuit in said unit, means including said gate circuit for normally coupling said pulses to the bottom end of said cable, means at the earth's surface for developing a control pulse and applying the same to the upper end of said cable for transmission to said unit, a bistable control circuit in said unit, means for applying said control pulse to one input of said bistable circuit, thereby to cause said control circuit to develop an output signal, means for utilizing said output signal to disable said gate circuit, whereby said pulses are prevented from being coupled to said cable, means at the earth's surface for momentarily disconnecting said source from said cable, and means for causing said bistable control circuit to return to its initial condition in response to said momentary disconnecton of said source from said cable, thereby to restore coupling of said pulses to said cable.

4. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said device being arranged to develop electrical pulses corresponding to a measured variable, a gate circuit in said unit, means including said gate circuit for normally coupling said pulses to the bottom end of said cable, means at the earth's surface for developing a control pulse and applying the same to the upper end of said cable for transmission to said unit, a bistable control circuit in said unit, means for causing said control circuit to assume a predetermined initial condition of conduction in response to the connection of said source to said cable, means for applying said control pulse to said bistable control circuit to cause the same to assume a different condition of conduction, means responsive to said change in condition of conduction of said control circuit for disabling said gate circuit, thereby to prevent coupling of said pulses to said cable, means at the earth's surface for disconnecting said source from said cable, and means whereby said control circuit reassumes said initial condition of conduction when said source is reconnected to said cable.

5. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said device being arranged to develop electrical pulses corresponding to a measured variable, means coupling said pulses to the bottom end of said cable for transmission to the earth's surface, means at the earth's surface for developing a control pulse and applying the same to the upper end of said cable for transmission to said unit, a pair of transistors in said unit, means interconnecting said transistors to form a bistable control circuit which has a predetermined condition of conduction when power is supplied thereto, means connecting said transistors to said cable, whereby said transistors are energized when said source is connected to said cable and said bistable control circuit assumes said predetermined condition of conduction, means for applying said control pulse to said bistable control circuit to cause the same to assume a different condition of conduction, means responsive to said different condition of conduction of said bistable control circuit for preventing said pulses from being coupled to said cable, means at the earth's surface for temporarily disconnecting said source from said cable, said bistable control circuit being de-energized when said source is disconnected and assuming said predetermined condition of conduction when said source is reconnected to said cable, and means responsive to the resumption of said predetermined condition by said bistable control circuit for restoring coupling of said pulses to said cable.

6. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said device being arranged to develop electrical pulses corresponding to a measured variable, means at the earth's surface for developing a control pulse and applying the same to the upper end of said cable for transmission to said unit, a pair of transistors in said unit, means interconnecting said transistors to form a bistable control circuit which has a predetermined condition of conduction when power is supplied thereto, means connecting said transistors to said cable, whereby said transistors are energized when said source is connected to said cable and said bistable control circuit assumes said predetermined condition of conduction, means for applying said control pulse to said bistable control circuit to cause the same to assume a different condition of conduction, means including a gate circuit in said unit for coupling said pulses to said cable, means for controlling said gate circuit in accordance with the condition of conduction of said bistable control circuit so that pulses are transmitted through said gate circuit when said control circuit is in said predetermined condition but not in said different condition, and means at the earth's surface for temporarily disconnecting said source from said cable, said bistable control circuit being deenergized when said source is disconnected and assuming said predetermined condition of conduction when said source is reconnected to said cable.

7. In a well logging system, the combination of, a subsurface unit, a cable for controlling movement of said unit through a bore hole, a unidirectional power source at the earth's surface and normally connected to said cable, a measuring device in said unit and energized by power supplied over said cable from said source, said device being arranged to develop electrical pulses corresponding to a measured variable, means coupling said pulses to the bottom end of said cable for transmission to the earth's surface, means at the earth's surface for developing a control pulse and applying the same to the upper end of said cable for transmission to said unit, a storage capacitor in said unit, means including a rectifier for connecting said capacitor to said cable so that said capacitor is charged when said source is connected to said cable, a pair of transistors in said unit, means for energizing one of said transistors directly from said cable and the other transistor from said storage capacitor, means interconnecting said transistors so that they form a bistable control circuit in which said other transistor is normally conducting when said source is connected to said cable, said control pulse being coupled to said other transistor to render the same nonconductive and cause said bistable control circuit to assume its other stable condition of conduction, means including a gate circuit in said unit for coupling said pulses to said cable, means for controlling said gate circuit in accordance with the condition of conduction of said other transistor so that pulses are transmitted through said gate circuit during periods when said other transistor is conducting, said rectifier being rendered nonconductive in response to said control pulse to prevent absorption of said control pulse in said storage capacitor, and means at the earth's surface for temporarily disconnecting said source from said cable, said bistable control circuit being deenergized when said source is disconnected and said one transistor being rendered conductive when said source is reconnected to said cable.

References Cited
UNITED STATES PATENTS

| | | | |
|---|---|---|---|
| 3,149,304 | 9/1964 | Summers | 340—18 |
| 3,187,301 | 6/1965 | Summers | 340—18 |
| 3,212,598 | 10/1965 | Anderson | 340—18 X |

RODNEY D. BENNETT, *Primary Examiner.*

SAMUEL W. ENGLE, *Examiner.*

R. M. SKOLNIK, D. C. KAUFMAN,
*Assistant Examiners.*